United States Patent
Fujii

(10) Patent No.: US 10,496,056 B2
(45) Date of Patent: Dec. 3, 2019

(54) MEASURED VALUE ANALYSIS APPARATUS AND MEASURED VALUE ANALYSIS METHOD

(71) Applicants: IHI Corporation, Koto-ku (JP); DIESEL UNITED, LTD., Chiyoda-ku (JP)

(72) Inventor: Takashi Fujii, Aioi (JP)

(73) Assignees: IHI Corporation, Koto-ku (JP); DIESEL UNITED, LTD., Chiyoda-ku (JP)

(*) Notice: Subject to any disclaimer, the term of this patent is extended or adjusted under 35 U.S.C. 154(b) by 156 days.

(21) Appl. No.: 15/272,890

(22) Filed: Sep. 22, 2016

(65) Prior Publication Data
US 2017/0010591 A1    Jan. 12, 2017

Related U.S. Application Data

(63) Continuation of application No. PCT/JP2015/060010, filed on Mar. 30, 2015.

(30) Foreign Application Priority Data

Mar. 31, 2014  (JP) .................. 2014-070796

(51) Int. Cl.
*G05B 13/04* (2006.01)
*G01D 21/00* (2006.01)
*G01P 3/00* (2006.01)

(52) U.S. Cl.
CPC .......... *G05B 13/048* (2013.01); *G01D 21/00* (2013.01); *G01P 3/00* (2013.01); *G05B 13/041* (2013.01); *G05B 2219/41235* (2013.01)

(58) Field of Classification Search
CPC ............ G05B 13/048; G05B 13/041; G05B 2219/41235; G01D 21/00; G01P 3/00
(Continued)

(56) References Cited

U.S. PATENT DOCUMENTS

| | | | |
|---|---|---|---|
| 2009/0240366 A1* | 9/2009 | Kaushal | G05B 13/0265 700/110 |
| 2009/0276077 A1 | 11/2009 | Good et al. | |
| 2011/0276828 A1* | 11/2011 | Tamaki | G05B 23/0254 714/26 |

FOREIGN PATENT DOCUMENTS

| | | |
|---|---|---|
| JP | 11-142139 | 5/1999 |
| JP | 2000-227342 | 8/2000 |
| JP | 2011-220204 | 11/2011 |

OTHER PUBLICATIONS

International Search Report dated Jun. 23, 2015 in PCT/JP2015/060010, filed Mar. 30, 2015 ( with English Translation).

(Continued)

*Primary Examiner* — Robert A Cassity
(74) *Attorney, Agent, or Firm* — Oblon, McClelland, Maier & Neustadt, L.L.P.

(57) ABSTRACT

A measured value analysis apparatus includes a controller and a memory, in which the controller: selects one examination object item, which is an examination object, and a plurality of related items which are directly or indirectly related to the examination object item; creates a correlation model between measured values from past measured values of the examination object item and the plurality of related items; and calculates a predicted value of the examination object item by applying the measured values of the related items to the correlation model and calculates divergence between an actual measured value of the examination object item and the predicted value.

7 Claims, 9 Drawing Sheets

(58) Field of Classification Search
USPC .......................................................... 700/30
See application file for complete search history.

(56) References Cited

OTHER PUBLICATIONS

Written Opinion dated Jun. 23, 2015 in PCT/JP2015/060010, filed Mar. 30, 2015 ( with English Translation).
Provision (issued by IBM Japan Ltd), Jul. 30, 2013, 12 pages.
Extended European Search Report dated Oct. 12, 2017 in Patent Application No. 15772910.4, citing references AA—AC therein, 9 pages.

* cited by examiner

MEASURED VALUE ANALYSIS APPARATUS AND MEASURED VALUE ANALYSIS METHOD

TECHNICAL FIELD

The disclosure of the present application relates to a measured value analysis apparatus and a measured value analysis method and is suited for application to a measured value analysis apparatus and measured value analysis method for analyzing measured values on the basis of the correlation between measurement items.

RELATED ART

A measured value of a certain measurement item is a result of factors of various physical phenomena. So, conventionally when analyzing a measured value, an average value of measured values which were measured in the past over a long period of time is calculated and components diverged from this average value are eliminated as components attributable to external factors which influence the measurement item.

For example, according to PTL 1, three-dimensional positions of measurement object points are measured by a three-dimensional automatic measurement apparatus; and when correcting three-dimensional positions of a plurality of measurement object points with high accuracy, an error table is created by forming a table of differences between measured values and a command value of a control device and the measured values measured by the three-dimensional automatic measurement apparatus are corrected by using this error table.

Furthermore, when the number of steps is measured by using a pedometer according to PTL 2, step count detection errors of a step count detector are calculated in advance on the basis of a step count value of a person who carries the pedometer, and a correction value for correcting the errors is stored and a step count value detected by the step count detector is automatically corrected.

In this way, with the above-described PTL 1 and PTL 2, the measured values can be automatically corrected by recognizing components, which might become errors of a certain measurement item, in advance and the components which might become the errors are eliminated from an actually measured value.

CITATION LIST

Patent Literature

[PTL 1] Japanese Patent Application Laid-Open (Kokai) Publication No. 1999-142139
[PTL 2] Japanese Patent Application Laid-Open (Kokai) Publication No. 2000-227342

SUMMARY

However, factors causing errors of a measured value of a certain measurement item are results of various physical phenomena. So, if which factors are related to the measured value cannot be recognized in advance, it is difficult to appropriately calculate components which influence the measured value of the measurement item which is an examination object.

The present application aims at suggesting a measured value analysis apparatus and measured value analysis method capable of appropriately calculating components which influence the measured value of the measurement item, which is the examination object, on the basis of the correlation between pluralities of measurement items.

The disclosure of the present application relates to: selecting one examination object item, which is an examination object, and a plurality of related items which are directly or indirectly related to the examination object item; creating a correlation model between measured values from past measured values of the examination object item and the plurality of related items; and calculating a predicted value of the examination object item by applying the measured values of the related items to the correlation model and calculating divergence between an actual measured value of the examination object item and the predicted value.

Effects

According to the above-described disclosure, the components which influence the measured value which is the measurement object can be calculated appropriately on the basis of the correlation between the pluralities of measurement items, thereby enabling measurements with high accuracy.

EMBODIMENTS

Figure 1:
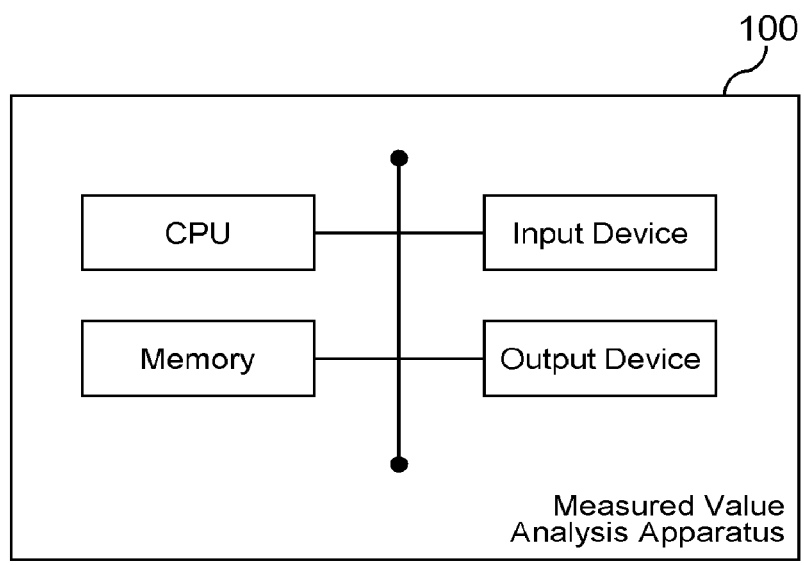
FIG. 1 is a block diagram illustrating a hardware configuration of a measured value analysis apparatus according to a first embodiment

An embodiment will be explained below in detail with reference to drawings.

(1) Outline of this Embodiment

Firstly, the outline of this embodiment will be explained. Factors causing errors of a measured value of a certain measurement item are the results of various physical phenomena as described above. Therefore, it is necessary to recognize which factors are related to a measured value of a measurement item which is an examination object (the measurement item will be hereinafter sometimes explained as being referred to as the examination object item).

In this embodiment, the examination object item is an uncontrolled value and the following explanation will be given by taking a vessel speed of a vessel as an example of the examination object item. Conventionally, a driving state of the vessel speed is estimated by using the correlation between the vessel speed, a propeller rotational speed, and main engine output. Specifically speaking, an estimated value of a measured value of the vessel speed which is the examination object item (the estimated value of the measured value will be hereinafter referred to and explained as the predicted value) is calculated by constructing the correlation between the propeller rotational speed and the vessel speed, the correlation between the main engine output and the propeller rotational speed, and the correlation between the main engine output and the vessel speed from a plurality of measured values and applying a new measured value (the new measured value will be hereinafter referred to and explained as the actual measured value) to those correlations.

Under this circumstance, when the main engine output and the propeller rotational speed are directly connected with respect to the structure of the vessel, the relationship between the main engine output and the propeller rotational speed is a one-to-one relationship if there is no external factor. However, practically, their relationship is not the one-to-one relationship due to degradation over time and environmental factors. Moreover, similarly to the relationship between the main engine output and the propeller rotational speed, the propeller rotational speed and the vessel speed are in a one-to-one relationship if there is no external factor; however, practically, their relationship changes due to the degradation over time or the environmental factors.

Therefore, even if the predicted value of the vessel speed is calculated by using a measured value of the main engine output and a measured value of the propeller rotational speed, there have been problems of inability to recognize which measurement item is influenced by the external factors, and to appropriately calculate components which influence the measured value of the measured vessel speed.

In order to appropriately calculate the components which influence the measured value of the measured vessel speed, it is necessary to ensure that the measured values of the main engine output and the propeller rotational speed which are engineeringly related to the vessel speed, which is the examination object item, are made to be values which are not influenced by the external factors. So, this embodiment makes it possible to appropriately calculate the components which influence the measured value of the vessel speed which is the examination object item, by creating a correlation model indicative of the relationship between pluralities of measurement items including a plurality of measurement items which are engineeringly related to the main engine output and the propeller rotational speed, and applying the measured values to this correlation model.

(2) Configuration of Measured Value Analysis Apparatus

Next, the configuration of a measured value analysis apparatus 100 will be explained. The measured value analysis apparatus 100 is an information processing equipment for analyzing measured values, which are measured by various sensors, and is configured of, for example, a personal computer or a workstation.

Furthermore, the measured value analysis apparatus 100 is equipped with information processing resources such as a CPU and a memory. The CPU functions as an arithmetic processing unit and is a controller that controls the operation of the measured value analysis apparatus 100 in accordance with programs and operation parameters stored in the memory. Furthermore, the measured value analysis apparatus 100 includes input devices such as a keyboard, a switch, a pointing device, and a microphone and output devices such as a monitor display and a speaker, so that it sets various parameters from the input devices and has the output devices display analysis results.

Figure 2:
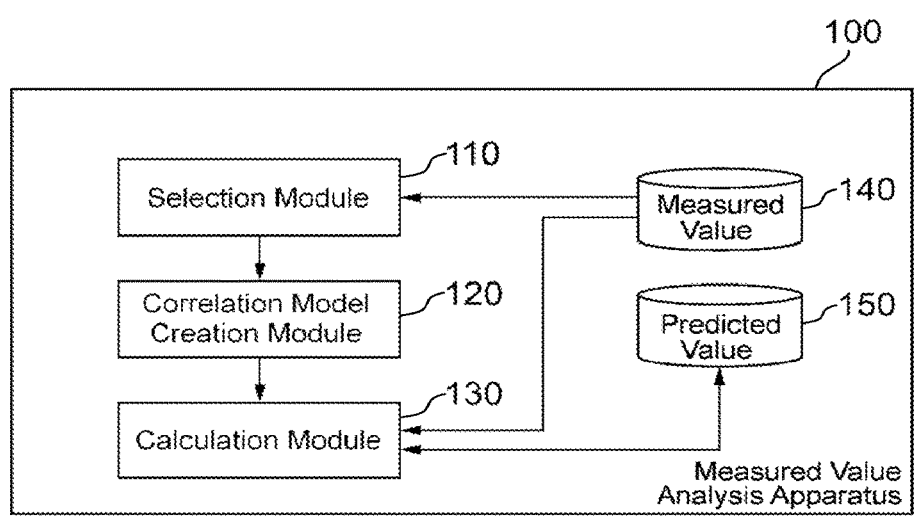
FIG. 2 is a block diagram illustrating a functional configuration of the measured value analysis apparatus according to the embodiment.

Next, a functional configuration of the measured value analysis apparatus 100 will be explained with reference to FIG. 2. The measured value analysis apparatus 100 functions as a selection module 110, a correlation model creation module 120, and a calculation module 130 as illustrated in FIG. 2. Incidentally, each module is implemented by software and/or hardware.

The selection module 110 has a function that selects one examination object item which is an examination object, and a plurality of related items which are directly or indirectly related to the examination object item. The selection module 110 extracts measured values of the selected examination object item and the plurality of related items from a data group of a large number of past measured values 140 and provides the extracted measured values to the correlation model creation module 120.

The correlation model creation module 120 creates a correlation model by machine-learning of the correlation between the measured values from the data group of the large number of past measured values 140 provided by the selection module 110. The correlation model creation module 120 creates the correlation model by using a data analysis technique such as IBM's ANACONDA (Anomaly Analyzer for Correlational Data).

Then, the calculation module 130 has a function that calculates a predicted value 150 of each item by applying actual measured values of the examination object item and the related items to the correlation model, and calculates divergence between the actual measured value and the predicted value of each item.

Furthermore, the correlation model creation module 120 evaluates whether the correlation model is adequate or not, by verifying accuracy in coincidence between the predicted values of the related items, other than the examination object item, which are calculated by using the created correlation model, and the actual measured values.

Specifically speaking, the correlation model creation module 120 creates the correlation model by, for example, extracting measured data for the past two months or so about the measured values of the examination object item and the plurality of related items and using, for example, IBM's ANACONDA (Anomaly Analyzer for Correlational Data). Then, the correlation model creation module 120: calculates a predicted value of each measurement item of the examination object item and the plurality of related items by applying the actual measured value of the examination object item during a specified period to the correlation model; and calculates and verifies the divergence (dispersion) between the predicted value and the actual measured value.

Since the correlation model is a result of machine-learning of the correlation between the measured values by executing statistical processing based on a large amount of measured values, the strength of the correlation between the measurement items varies, but there is no hierarchical relationship between them. However, in order to ensure that the measured values of the related items which are engineeringly related to the examination object item, are made to be values which are not influenced by the external factors as described earlier, it is necessary to create the correlation model in consideration of an engineering relationship between the pluralities of measurement items. Therefore, the selection module 110 selects a plurality of related items which are engineeringly directly or indirectly related to an examination object item, in consideration of an engineering subordinate relationship between the measurement items.

Now, the subordinate relationship between the examination object item and the related items will be explained with reference to FIG. 2. Referring to FIG. 2, Measurement Item A represents the examination object item. The examination object item is an object item, which is required in order to recognize the degree of influence of components attributable to external factors other than the measured values, and is, for example, the vessel speed. Furthermore, Measurement Item A is determined as a first-tier measurement item.

Figure 3:
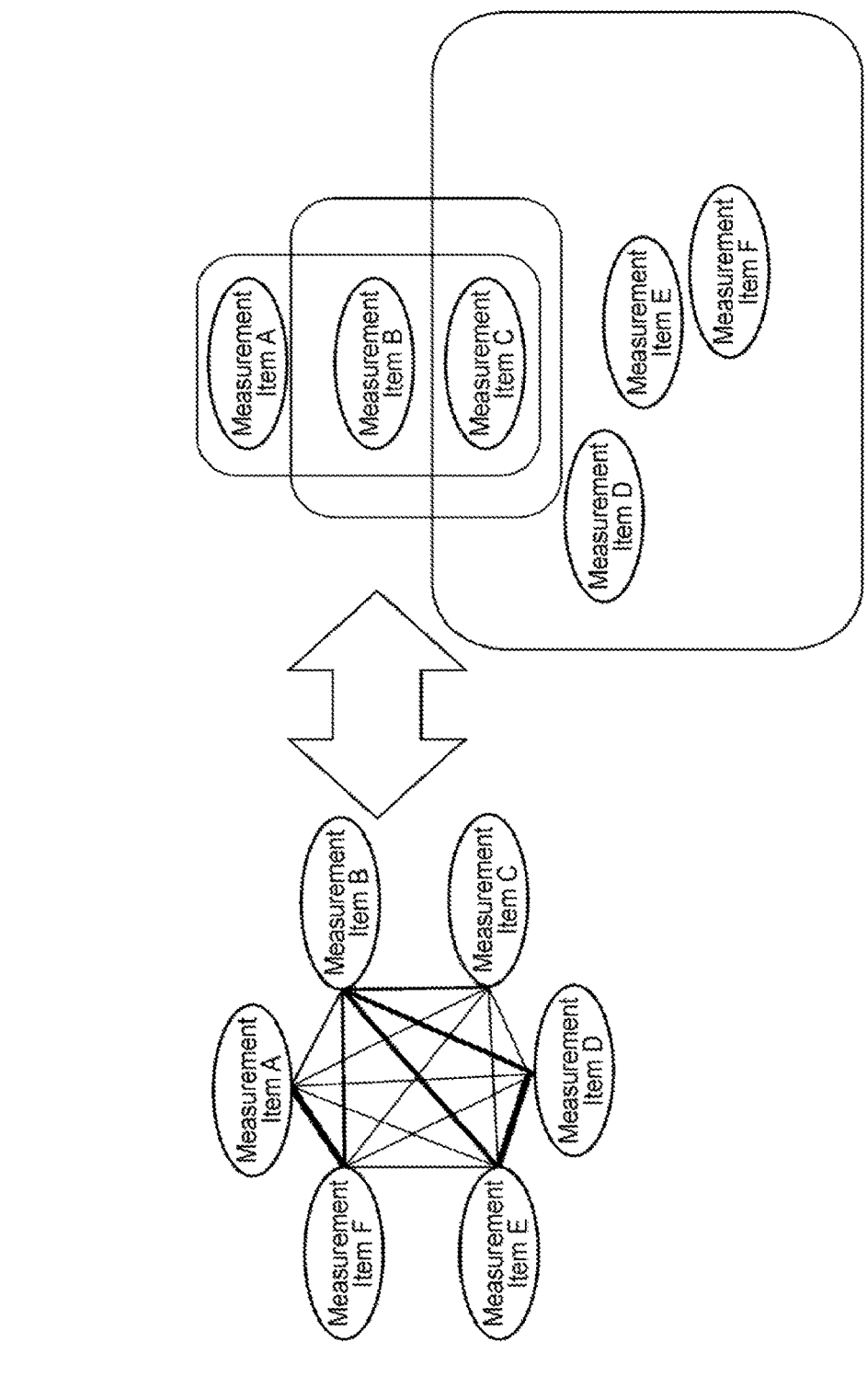
FIG. 3 is a conceptual diagram for explaining a subordinate relationship between an examination object item and related items according to the embodiment.

Furthermore, the related items include related items which are engineerlingly directly related to the examination object item, and related items which are not engineeringly directly related to the examination object item, but are indirectly related to the examination object item via the relevant related item. Referring to FIG. 3, Measurement Items B to F are the related items.

Referring to FIG. 3, Measurement Item B and Measurement Item C are the related items which are engineerlingly directly related to the examination object item, and they are determined as second-tier measurement items. Furthermore, Measurement Items D, E, and F are the related items which are not engineeringly directly related to the first-tier measurement item, but are indirectly related to the first-tier measurement item via the second-tier measurement items; and they are determined as third-tier measurement items. A measurement item which is related to an n-tier measurement item will be hereinafter explained as an n+1 tier measurement item.

When Measurement Item A is the vessel speed, the related items which are engineeringly directly related (the second-tier measurement items) can be, for example, the propeller rotational speed and the main engine output (Measurement Items B and C). Furthermore, items which are not engineeringly directly to the vessel speed, but are engineerlingly directly related to the propeller rotational speed and the main engine output (third-tier measurement items) can be, for example, a fuel input amount, a supercharging pressure, and a fuel heating value (Measurement Items D to F).

Furthermore, fourth-tier measurement items which are engineeringly directly related to the third-tier measurement items can be, for example, a supercharger rotational speed and an intake air temperature. The fourth-tier measurement items are the related items which are engineeringly directly related to the third-tier measurement items, and may or may not be engineeringly directly related to the second-tier measurement items, and are indirectly related to the first-tier measurement item via any or all of the measurement items of the second and third tiers.

Furthermore, fifth-tier measurement items which are engineeringly directly related to the fourth-tier measurement items can be, for example, an exhaust gas temperature at a supercharger outlet and an exhaust gas temperature at a cylinder outlet.

The fifth-tier measurement items are the related items which are engineeringly directly related to the fourth-tier measurement items, and may or may not be engineeringly directly related to the measurement items of the second or third tier, and are indirectly related to the first-tier measurement item via any or all of the measurement items of the second, third, and fourth tiers.

In this way, the related items which are directly or indirectly related to the examination object item are composed of multi-level tiers. For example, when the correlation model is created by focusing on the above-described relationship between the first tier and the second tier, the first-tier measurement item and the second-tier measurement items influence each other, thereby causing significant errors in the predicted values calculated by using the correlation model. Specifically speaking, when the divergence between the predicted value calculated by using the correlation model, and an actual measured value is large with respect to all the measurement items, it is impossible to judge which environmental factor influences which measurement item.

So, in this embodiment, the influence of environmental factors on the related items is eliminated by selecting a plurality of related items required to create the correlation model from the related items included in the multi-level tiers so that the predicted values and the actual measured values are made to coincide with each other with respect to the related items other than the examination object item.

Particularly, when the divergence between the predicted value and the actual measured value of the second-tier measurement item is equal to or less than a specified threshold value (for example, 0.1) from among the related items selected to create the correlation model, the correlation model can be evaluated as adequate. In other words, it is possible to judge that the vessel speed can be predicted by using this correlation model. On the other hand, when the divergence between the predicted value and the actual measured value of the second-tier measurement item exceeds or is more than the specified threshold value, the correlation model is not adequate and, therefore, an appropriate related item is re-selected and the correlation model is evaluated again.

Next, the difference in accuracy of predicted values using the correlation model due to the difference in the number of selected related items will be explained with reference to FIG. 4.

Figure 4:
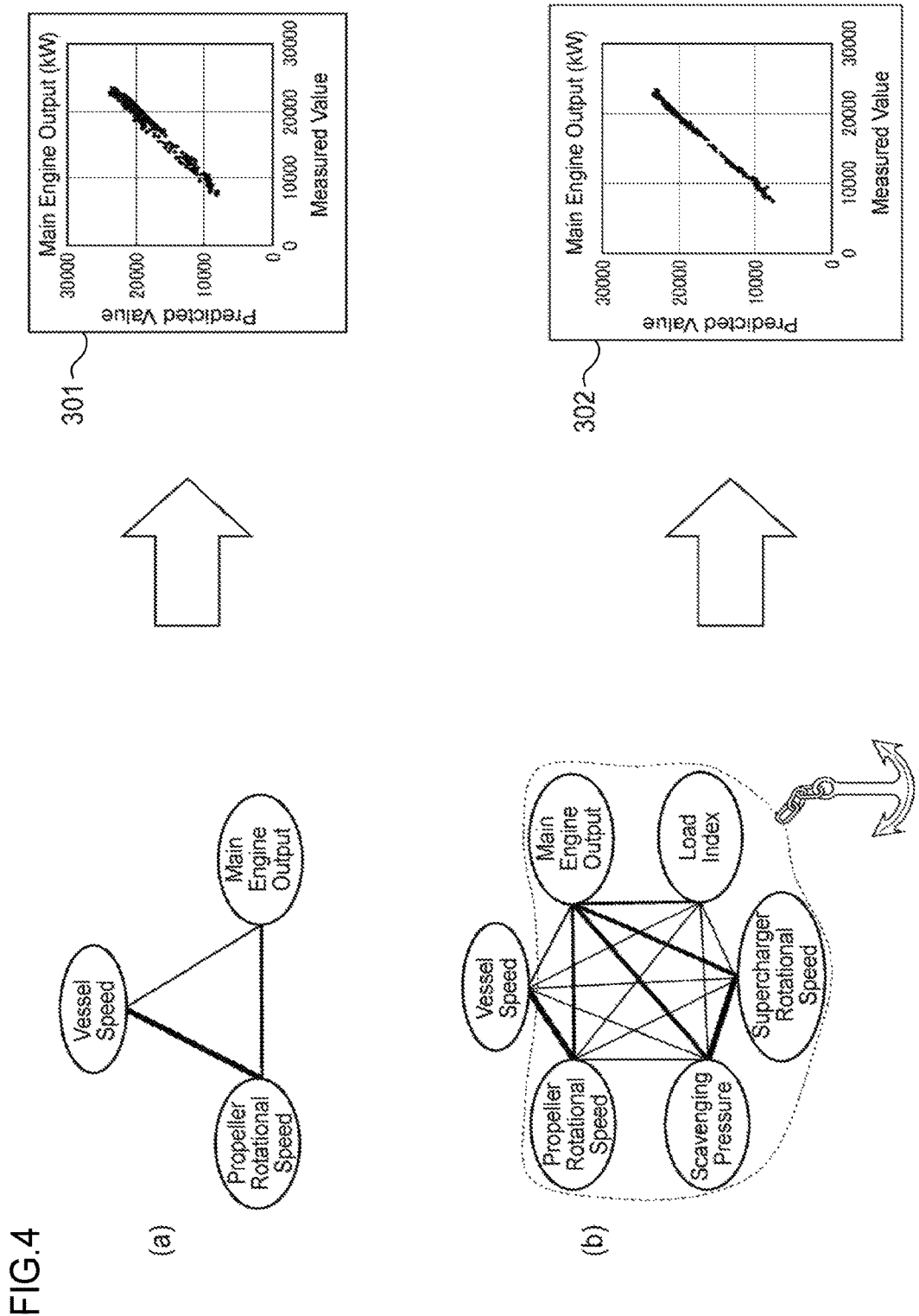
FIG. 4 is a conceptual diagram for explaining the accuracy of a predicted value in the embodiment.

FIG. 4(*a*) shows the results of analysis when the correlation model is created by selecting three measurement items. Furthermore, FIG. 4(*b*) shows the results of analysis when the correlation model is created by selecting nine measurement items. The analysis herein means to calculate a predicted value of an object measurement item by applying a measured value to the created correlation model and verify the divergence between an actual measured value and the predicted value.

For example, referring to FIG. 4(*a*), among the three measurement items, the examination object item (the first tier) is the vessel speed and the related items which are engineerlingly directly related (the second tier) are the propeller rotational speed and the main engine output. A graph 301 shows the analysis results of the main engine output.

The vertical axis of the graph 301 represents the predicted value of the main engine output calculated by applying a past data group of the vessel speed and the propeller rotational speed, other than the main engine output, to the created correlation model; and its horizontal axis represents the relevant measured value of the main engine output. The graph 301 indicates the divergence between the predicted value and the measured value of the main engine output. The graph 301 shows that when the correlation model is created with only data of the related items of the second tier, dispersion is high and the accuracy in coincidence between the predicted value and the measured value of the main engine output is low.

On the other hand, referring to FIG. 4(*b*), among the nine measurement items, the examination object item (the first tier) is the vessel speed, the related items which are engineerlingly directly related (the second tier) are the propeller rotational speed and the main engine output, and the related items which are engineeringly to them (the third tier) are a scavenging pressure, a supercharger rotational speed (of two superchargers), a load index, an air temperature, and a supercharger exhaust gas temperature (of two superchargers). A graph 302 shows the analysis results of the main engine output and indicates the divergence between the predicted value of the main engine output, which is calculated by applying measurement values of a past data group, other than the main engine output, to the created correlation model created by using the nine measurement items in total, and the measured value of the main engine output. The graph 302 shows that when the correlation model is created by including not only data of the related items of the second tier, but also data of the related items of the third tier, the dispersion is low and the accuracy in coincidence between the predicted value and the measured value of the main engine output is high.

Accordingly, the accuracy in coincidence between the predicted value and the measured value of the second-tier measurement item can be enhanced and the adequate correlation model can be created by including not only the main engine output and the propeller rotational speed (the second-tier measurement items) which are directly related to the first-tier measurement item such as the vessel speed, which is the examination object item, but also the plurality of measurement items which are engineeringly subordinated to the main engine output and the propeller rotational speed (the measurement items of the third or lower tiers).

Furthermore, when the predicted value and the actual measured value of the measurement items, other the examination object item, coincide with each other with high accuracy, it is possible to estimate that the dispersion (divergence) between the predicted value and the actual measured value of the vessel speed is caused by not the influence of the measurement items such as the main engine output or the propeller rotational speed, but by factors other than the measurement items.

Therefore, it is necessary to create the correlation model by selecting many related items in order to enhance the accuracy in coincidence between the predicted value and the measured value. However, if a measurement item which is engineeringly related as described earlier, but is discontinuously controlled (such as ON-OFF control) is included, a precise estimation cannot be obtained. Therefore, the measurement items other than the examination object item need to be measurement items which are engineeringly directly or indirectly related to the examination object item and are measurement items of uncontrolled objects or continuously controlled objects. Furthermore, since calculation cost for creation of the correlation model greatly depends on the number of the related items, inclusion of unnecessary related items may lead to an increase in the calculation cost and is thereby inappropriate.

Figure 5:
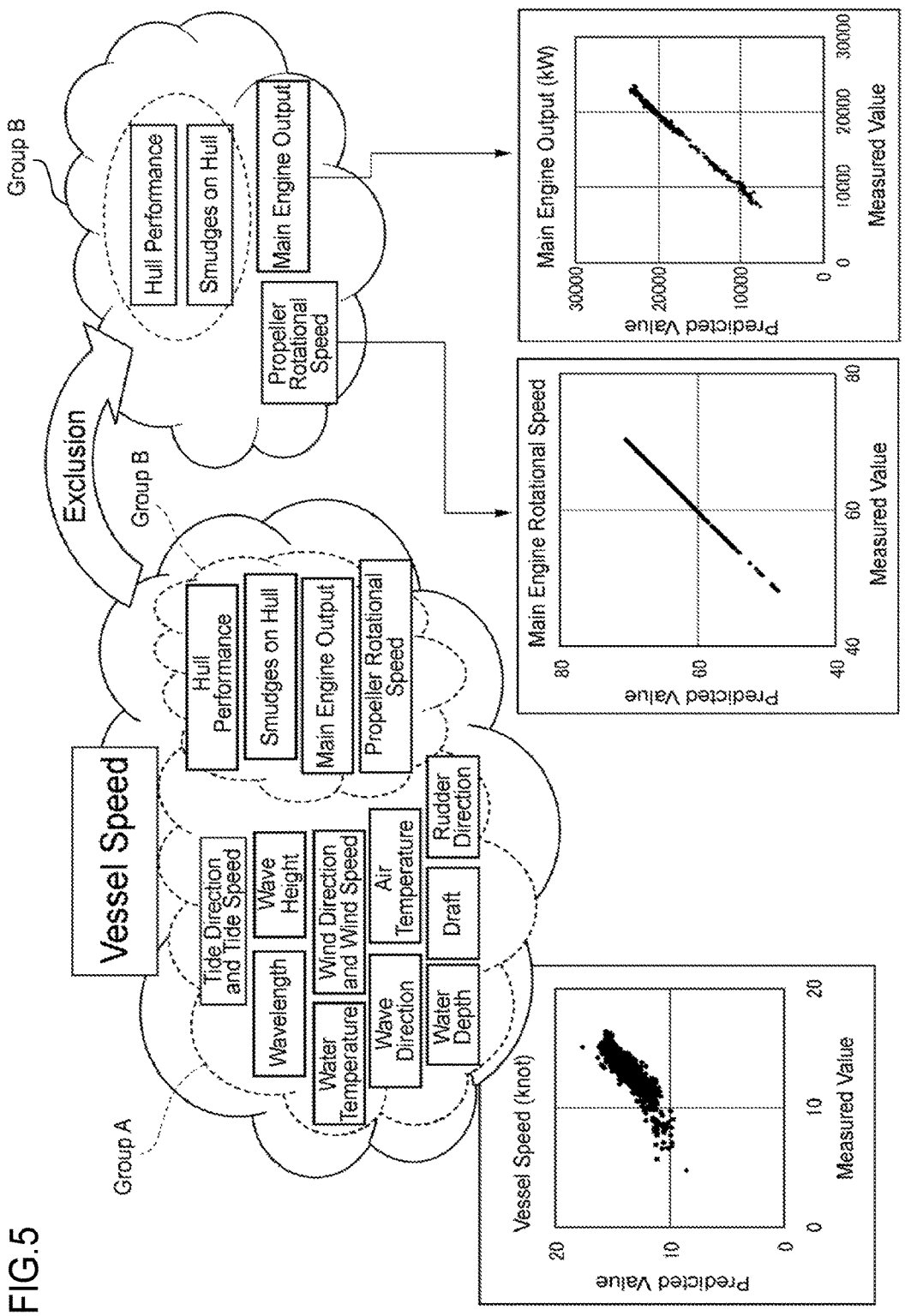
FIG. 5 is a conceptual diagram for explaining factors which influence measured values according to the embodiment.

Referring to FIG. 5, the measured value of the vessel speed is a measured value which changes due to influences of, for examples, external factors (Group A) such as a wavelength, a wave height, a tide direction, and a tide speed and factors attributable to a hull structure such as the main engine output and the propeller rotational speed (Group B). In other words, factors of the dispersion between the predicted value and the actual measured value of the vessel speed are influenced by Group A and Group B.

Under this circumstance, if the predicted value and the actual measured value of the measurement item such as the main engine output and the propeller rotational speed of Group B coincide with each other with high accuracy as described earlier, the influences of the main engine output and the propeller rotational speed can be eliminated from the factors of dispersion between the predicted value and the actual measured value of the vessel speed.

Furthermore, assuming that the factors such as hull performance and smudges on hull have not changed after the creation of the correlation model up until present time, the influences of, for example, the hull performance and the smudges on hull can be also eliminated because they have nothing to do with the dispersion between the predicted value and the actual measured value of the vessel speed. Accordingly, if the influences of Group B can be eliminated from the measured value of the vessel speed, the factors of the dispersion between the predicted value and the actual measured value of the vessel speed can be determined as the external factors of Group A.

(3) Details of Measured Value Analysis Processing

Next, the details of measured value analysis processing by the measured value analysis apparatus 100 will be explained. In the following explanation, a processing subject of various processing will be explained by mentioning each module of the measured value analysis apparatus 100 as a subject; however, needless to say, the CPU for the measured value analysis apparatus 100 actually executes the processing on the basis of each program stored in the memory of the measured value analysis apparatus 100.

Figure 6:
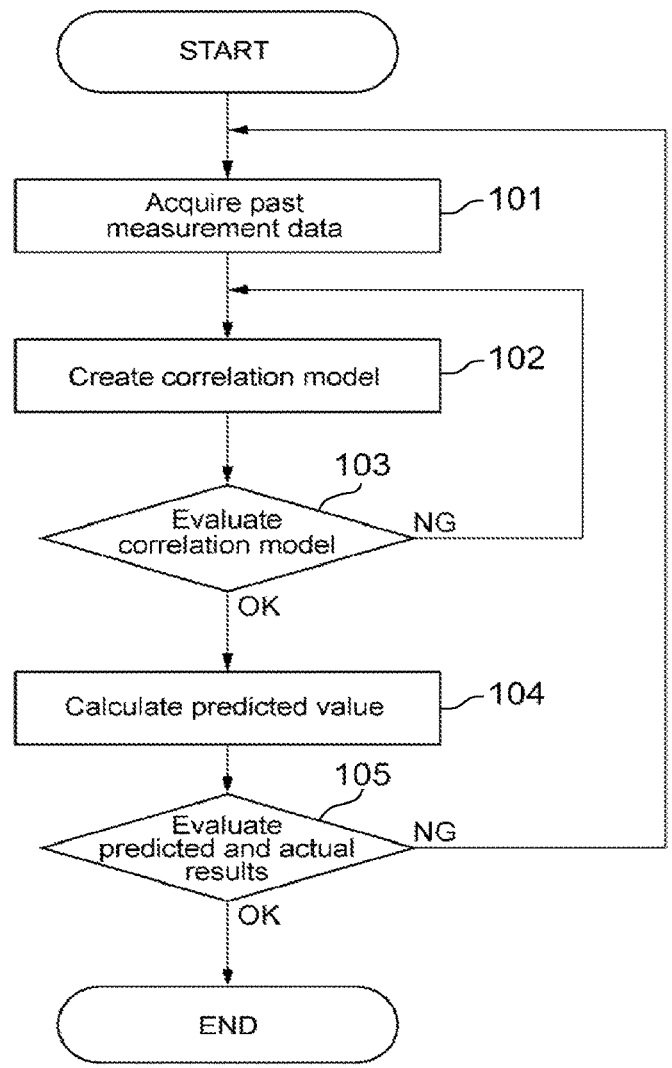
FIG. 6 is a flowchart illustrating correlation model creation processing according to the embodiment.

Firstly, the correlation model creation processing by the correlation model creation module 120 will be explained with reference to FIG. 6. Referring to FIG. 6, the selection module 110 firstly acquires past measured data from the measured value 140 (S101). Specifically speaking, the selection module 110 extracts the measured data of the examination object item and a plurality of related items which are directly or indirectly related to the examination object item, from the measured value 140. The measured data to be extracted is measured data for, for example, two months and the measured data may be decimated and extracted to form approximately 2000 to 3000 data sets.

Then, the correlation model creation module 120 creates the correlation model from the measured data acquired in step S101 (S102). Specifically speaking, the correlation model creation module 120 creates the correlation model from the measured data by using the data analysis technique such as IBM's ANACONDA (Anomaly Analyzer for Correlational Data).

Then, the correlation model creation module 120 evaluates the correlation model created in step S102 (S103). Specifically speaking, the correlation model creation module 120 evaluates whether an adequate correlation model without errors or the like in mathematical expressions has been created or not, on the basis of an extraction period or decimation method of the measured data by applying the measured data to algorithms such as ANACONDA (Anomaly Analyzer for Correlational Data).

When the correlation model is evaluated as being incorrect in step S103 (the processing branches to NG in step S103), the processing returns to step S102 and the correlation model creation module 120 re-creates the correlation model.

On the other hand, when the correlation model is evaluated as being correct in step S103 (the processing branches to OK in step S103), the calculation module 130 calculates a predicted value of each calculation item by applying a new measured value (actual measured value) to the correlation model (S104). Specifically speaking, the calculation module 130 calculates a predicted value of the object measurement item by applying the actual measured value of the measurement item other than the object measurement item to the correlation model.

Then, the calculation module 130 evaluates the result of comparison between the predicted value and the actual measured value (predicted and actual results) (S105). Specifically speaking, the calculation module 130 judges whether or not the divergence between the predicted value and the actual measured value of the plurality of related items is equal to or less than a specified threshold value with respect to each tier. For example, the calculation module 130 judges whether or not the threshold value for the related items (the second tier) which are engineerlingly directly related to the examination object item (the first tier) is equal to or less than the specified threshold value.

When it is determined in step S105 that the divergence between the predicted value and the actual measured value of the plurality of related items is equal to or less than the specified threshold value (the processing branches to OK in step S105), the processing is terminated. On the other hand, when it is determined in step S105 that the divergence between the predicted value and the actual measured value of the plurality of related items is more than the specified threshold value (the processing branches to NG in step S105), the processing returns to the processing in step S101 and the processing in step S101 and subsequent steps is repeated and targeted on the past measured data of related items different from those used to create the correlation model last time.

The coincidence between the predicted value and the actual measured value of the plurality of related items is required in order to create an adequate correlation model as described earlier. Therefore, in step S105, the plurality of related items are selected and the correlation model is created from the measured data of such related items so that the predicted value and the actual measured value of the plurality of related items, other than the examination object item, coincide with each other. Specifically speaking, the accuracy in coincidence between the predicted value and the actual measured value of each related item is enhanced to change the state of high dispersion as illustrated in the graph 301 of FIG. 4 to the state of low dispersion as illustrated in the graph 302.

For example, when the examination object item is the vessel speed, the accuracy in coincidence between the predicted value and the actual measured value in S105 can be enhanced by creating the correlation model by extracting not only the measured values of the propeller rotational speed and the main engine output which are engineerlingly directly related to the vessel speed, but also the measured values of, for example, the scavenging pressure, the supercharger rotational speed, the load index, the air temperature, and the supercharger exhaust gas temperature which are indirectly related to the vessel speed as described above. Under this circumstance, it is important to enhance the accuracy in coincidence between the predicted value and the actual measured value with respect to the measured values of the propeller rotational speed and the main engine output which are engineerlingly directly related to the vessel speed.

Furthermore, when creating the correlation model by selecting the plurality of related items, the correlation model may be created by prioritizing selection of the related items of particularly the second-tier measurement items among the plurality of related items so that the accuracy in coincidence between the predicted value and the actual measured value will become higher. Accordingly, it is possible to determine that the dispersion between the predicted value and the actual measured value of the examination object item is caused by factors other than the related items, by creating the correlation model by selecting the related items regarding which the accuracy in coincidence between the predicted value and the actual measured value is high.

Figure 7:
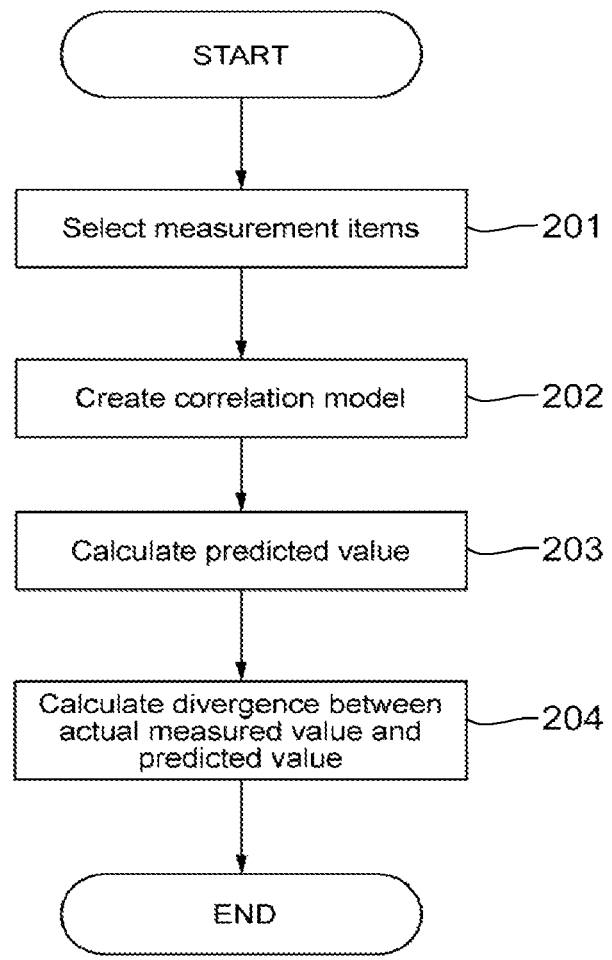
FIG. 7 is a flowchart illustrating measured value analysis processing according to the embodiment.

Next, the details of measured value analysis processing will be explained with reference to FIG. 7. Firstly, the selection module 110 selects the examination object item and the plurality of related items to create the correlation model (S201). The measurement items selected in step S201 are the measurement items selected when creating the correlation model evaluated as being adequate during the correlation model creation processing explained with reference to FIG. 6.

Specifically speaking, the measurement items selected in step S201 are the examination object item and the related items directly or indirectly related to the examination object item, and are the related items regarding which the accuracy in coincidence between the predicted value calculated by using the correlation model, and the actual measured value is high.

Subsequently, the correlation model creation module 120 creates the correlation model by using the measured values of the measurement items selected in step S201 (S202). Furthermore, the measured values used in step S202 are measured data of a period of time and quantity required to create the adequate correlation model, from among the past measured data of the measurement items selected in step S201.

Then, the calculation module 130 calculates the predicted value of the examination object item by applying a new measured value (actual measured value) other than the examination object item to the correlation model created in step S202 (S203).

Subsequently, the calculation module 130 calculates the divergence between the actual measured value of the examination object item and the predicted value of the examination object item as calculated in step S203 (S204).

Figure 8:
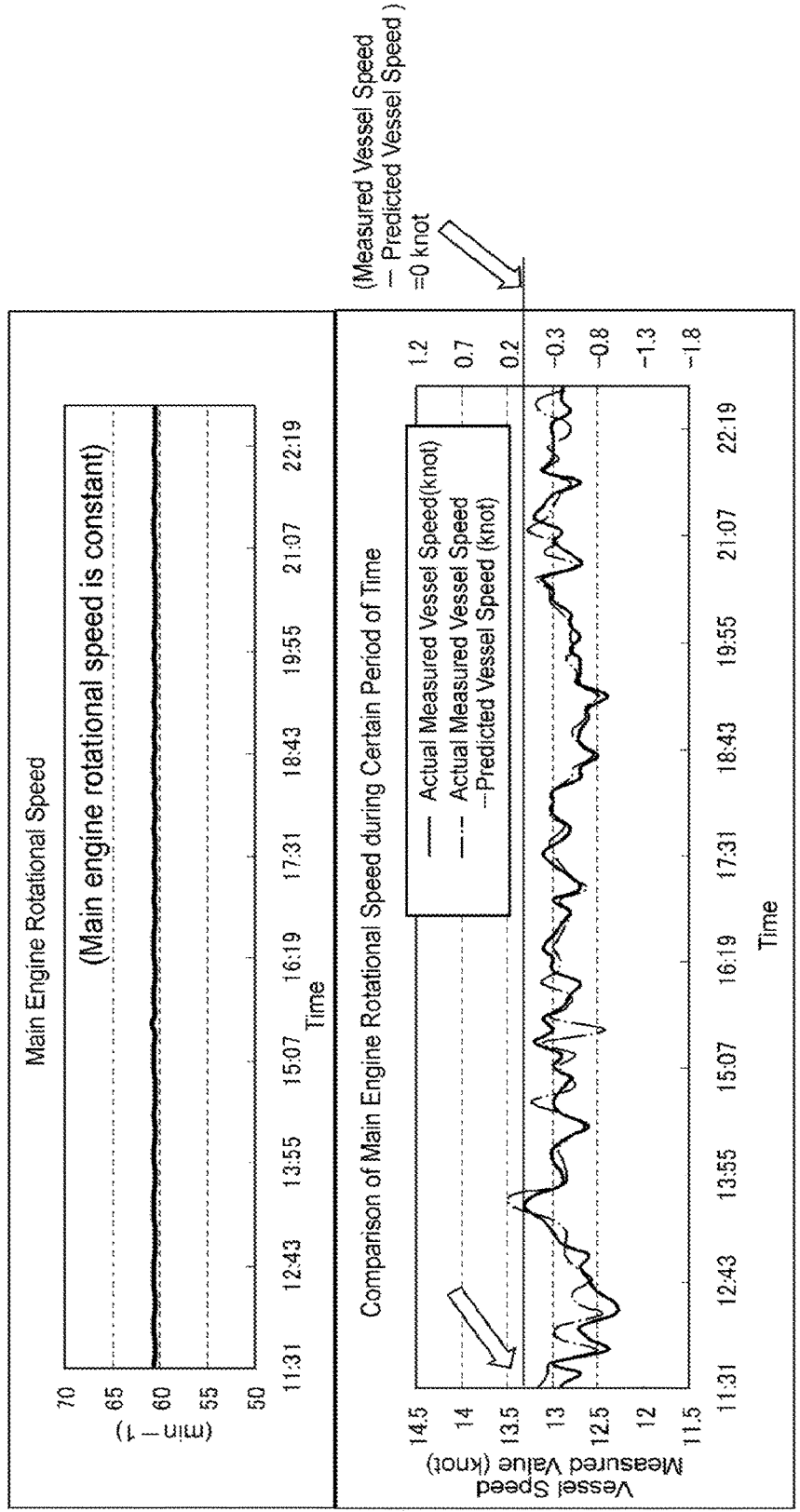
FIG. 8 is a conceptual diagram illustrating results of comparison between an actual measured value and a predicted value according to the embodiment.

For example, FIG. 8 shows results of comparison between the actual measured value and the predicted value of the vessel speed when the examination object item is the vessel speed, by focusing on the measurement results for a period of time when the main engine rotational speed related to the vessel speed is constant. When the main engine rotational speed is maintained constant and is not influenced by other factors, it is possible to estimate that the vessel speed becomes constant. Therefore, it is possible to assume that if the main engine rotational speed is constant, the rotations of the main engine does not influence the predicted value of the vessel speed. So, this means that the divergence between the actual measured value and the predicted value of the vessel speed calculates only the influence by external environmental factors.

A graph in FIG. 8 compares the actual measured value of the vessel speed with a value obtained by subtracting the predicted value from the actual measured value of the vessel speed. It shows that the accuracy in coincidence between the actual measured value of the vessel speed and the value obtained by subtracting the predicted value from the actual measured value of the vessel speed is high.

Figure 9:
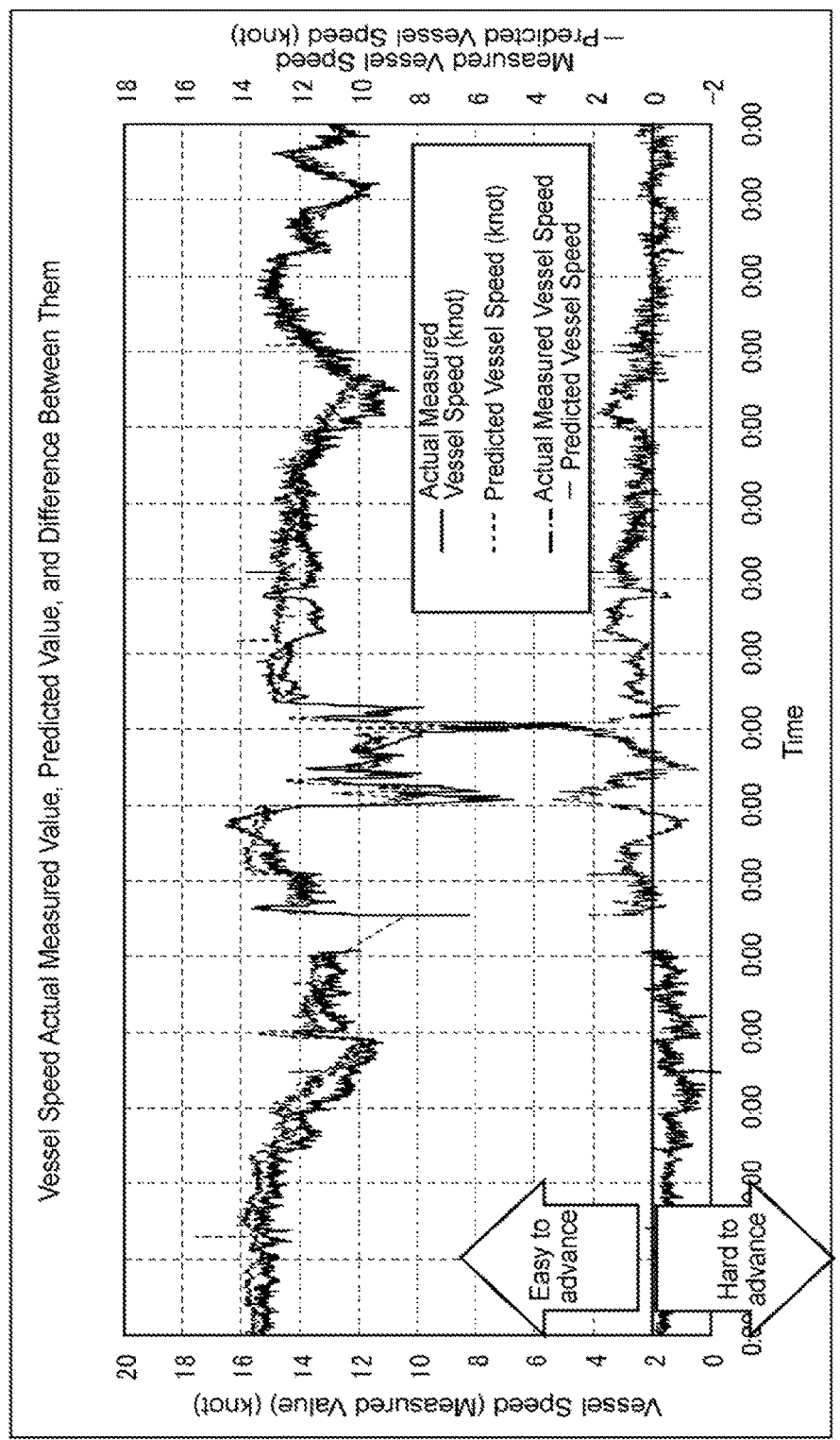
FIG. 9 is a conceptual diagram illustrating results of comparison between the actual measured value and the predicted value according to the embodiment.

Furthermore, FIG. 9 shows results of comparison between the predicted value of the vessel speed, which is calculated from the correlation model created by using the plurality of related items, and the actual measured value of the vessel speed. Since the accuracy in coincidence between the predicted value of the second-tier measurement item, which is calculated from this correlation model and is engineerlingly directly related, and its actual measured value is high as described above, the influence of the second-tier measurement item on the vessel speed is eliminated. Therefore, it can be determined that the difference between the predicted value and the actual measured value of the vessel speed as illustrated in FIG. 9 is influenced by the external environmental factors other than the influence of the second-tier measurement item.

Referring to FIG. 9, when the difference between the predicted value and the actual measured value of the vessel speed is 0 or less, it can be determined that the vessel is in a state of hardly advancing due to the external environmental factors. Furthermore, when the difference between the predicted value and the actual measured value of the vessel speed is more than 0, it can be determined that the vessel is in a state of easily advancing due to the external environmental factors.

Accordingly, since it can be determined that the difference between the predicted value and the actual measured value of the vessel speed which is the examination object item is caused by the external environmental factors, only the influence of the external environmental factors on the vessel speed can be extracted with high accuracy. Specifically speaking, the divergence between the predicted value and the actual measured value of the examination object item as calculated by creating the correlation model using the plurality of related items, regarding which the predicted value and the actual measured value coincide with each other, and by using such correlation model would mean a physical quantity that is not actually measured.

Furthermore, the above-described embodiment has explained the vessel speed as an example of the examination object item; however, the present invention is not limited to this example. For example, when the examination object item is efficiency of a gas turbine, a correlation model is created so that predicted values and actual measured values coincide with each other with respect to a plurality of related items related to the gas turbine efficiency, such as a gas turbine rotational speed, a fuel heating value, torque, output, and a gas pressure temperature, coincide with each other. Then, the difference between a predicted value of the gas turbine efficiency, which is calculated by applying the measured values of the plurality of related items to the created correlation model, and an actual measured value of the gas turbine is calculated, thereby making it possible to extract only the influence of, for example, smudges on the gas turbine which is an external environmental factor of the gas turbine efficiency.

Furthermore, for example, when the examination object item is efficiency of a boiler, a correlation model is created so that predicted values and actual measured values coincide with each other with respect to a plurality of related items related to the boiler efficiency, such as a fuel heating value, vapor pressure, vapor temperature, steam temperature, vapor amount, and exhaust gas temperature and pressure of the boiler, coincide with each other. Then, the difference between a predicted value of the boiler efficiency, which is calculated by applying the measured values of the plurality of related items to the created correlation model, and an actual measured value of the boiler is calculated, thereby making it possible to extract only the influence of, for example, smudges on heat transfer pipes, which is an external environmental factor of the boiler efficiency.

Furthermore, in this embodiment, the examination object item is a value which is not directly controlled. The vessel speed described above as an example is not a directly-controlled value like the propeller rotational speed or the main engine output, but is a value which is not directly controlled. However, the present invention disclosed in the present application is not limited to this example and the examination object item may be a controlled value.

For example, regarding a measured value of a control object adjusted as a result of control of a plurality of items, a correlation model is created by removing any calculation item from the controlled items and a correlation model is created by using calculation items of all the items, and the difference between predicted values calculated by using both the correlation models is calculated, so that an amount of influence by the item removed from control object values can be recognized.

For example, when a pressure value is controlled by adjusting three items, that is, an inflow amount, a temperature, and an outflow amount so that a specified pressure value becomes a target value, a correlation model is created by including all the items and a correlation model is creating by excluding the temperature item. Then, the difference between predicted values of the pressure calculated by using both the correlation models is calculated and it is thereby possible to estimate that such difference is the influence of the temperature upon the pressure.

(4) Advantageous Effects of this Embodiment

According to this embodiment as described above, the selection module 110 selects one examination object item, which is the examination object, and a plurality of related items which are directly or indirectly related to the examination object item; the correlation model creation module 120 creates a correlation model between measured values from past measured values of the examination object item and the plurality of related items; and the calculation module 130 calculates a predicted value of the examination object item by applying the measured values of the related items to the correlation model and calculates the divergence between an actual measured value of the examination object item and the predicted value. As a result, components influencing the measured value which is the measurement object can be calculated appropriately on the basis of the correlation between the pluralities of measurement items and the degree of influence of external factors other than the measured values can be recognized.

REFERENCE SIGNS LIST

100 measured value analysis apparatus
110 selection module
120 correlation model creation module
130 calculation module
140 measured value
150 predicted value

The invention claimed is:

1. A measured value analysis apparatus for analyzing a vessel on the basis of a measured value of the vessel, comprising:

a controller and a memory, the controller executing a program stored in the memory to:

select a specified related item from among a plurality of related items, each of which is related to an examination object item, wherein the examination object item is a physical quantity influenced by a structure of the vessel and an unmeasured environmental factor other than the plurality of related items, each of the plurality of related items is an item which influences an operating source of the vessel, and the plurality of related items includes a fuel input amount, a supercharging pressure, a fuel heating value, a scavenging pressure, a supercharger rotational speed, a load index, an air temperature, and a supercharger exhaust gas temperature;

read respective past measured values of the examination object item, the operating source, and the specified related item from the memory and create a correlation model between the examination object item, the operating source, and the specified related item on the basis of the past measured values;

calculate a predicted value of the operating source by applying the measured values of the specified related item to the correlation model and calculate divergence between an actual measured value of the operating source and the predicted value;

compare the calculated divergence with a specified threshold value;

finalize the correlation model when the calculated divergence is equal to or less than the specified threshold value as a result of the comparison;

re-select the specified related item, then create the correlation model, and further execute the calculation and the comparison of the divergence when the calculated divergence exceeds the specified threshold value as a result of the comparison;

calculate a predicted value of the physical quantity by applying the respective measured values of the operating source and the specified related item to the finalized correlation model;

compare an actual measured value of the physical quantity and the predicted value of the physical quantity;

set a result of the comparison of the actual measured value of the physical quantity and the predicted value of the physical quantity as an influence of the unmeasured environmental factor; and exclude the influence of the unmeasured environmental factor from a predicted value of the examination object.

2. The measured value analysis apparatus according to claim 1,
wherein the plurality of related items belong to any one of a plurality of tiers, and
wherein a measured value of a related item belonging to an nth tier from among the plurality of tiers influences a measured value of a related item belonging to an (n−1)th tier.

3. The measured value analysis apparatus according to claim 2,
wherein the controller selects the plurality of related items from a first tier to the nth tier.

4. The measured value analysis apparatus according to claim 2,
wherein the examination object item is a vessel speed, and
wherein the operating source is a main engine output of the vessel or a propeller rotational speed.

5. The measured value analysis apparatus according to claim 4,
wherein the controller selects at least one of the fuel input amount, the supercharging pressure, the fuel heating value, the scavenging pressure, the supercharger rotational speed, the load index, the air temperature, and the supercharger exhaust gas temperature, respectively, as belonging to the first tier.

6. The measured value analysis apparatus according to claim 4,
wherein the influence of the unmeasured environmental factor includes an influence attributable to a structure of the vessel.

7. A measured value analysis method for analyzing measured values of a plurality of measurement items, comprising:

selecting a specified related item from among a plurality of related items, each of which is related to an examination object item, wherein the examination object item is a physical quantity influenced by a structure of the vessel and an unmeasured environmental factor, each of the plurality of related items is an item which influences an operating source of the vessel, and the plurality of related items includes a fuel input amount, a supercharging pressure, a fuel heating value, a scavenging pressure, a supercharger rotational speed, a load index, an air temperature, and a supercharger exhaust gas temperature;

reading respective past measured values of the examination object item, the operating source, and the specified related item from the memory and creating a correlation model between the examination object item, the operating source, and the specified related item on the basis of the past measured values;

calculating a predicted value of the operating source by applying the measured values of the specified related item to the correlation model and calculating divergence between an actual measured value of the operating source and the predicted value;

comparing the calculated divergence with a specified threshold value;

finalizing the correlation model when the calculated divergence is equal to or less than the specified threshold value as a result of the comparison;

re-selecting the specified related item, then creating the correlation model, and further executing the calculation and the comparison of the divergence when the calculated divergence exceeds the specified threshold value as a result of the comparison;

calculating a predicted value of the physical quantity by applying the respective measured values of the operating source and the specified related item to the finalized correlation model;

comparing an actual measured value of the physical quantity and the predicted value of the physical quantity;

setting a result of the comparison of the actual measured value of the physical quantity and the predicted value of the physical quantity as an influence of the unmeasured environmental factor; and excluding the influence of the unmeasured environmental factor from a predicted value of the examination object.

* * * * *